Sept. 27, 1927.
E. L. ETHERIDGE
LICENSE PLATE HOLDER
Filed Aug. 22, 1925
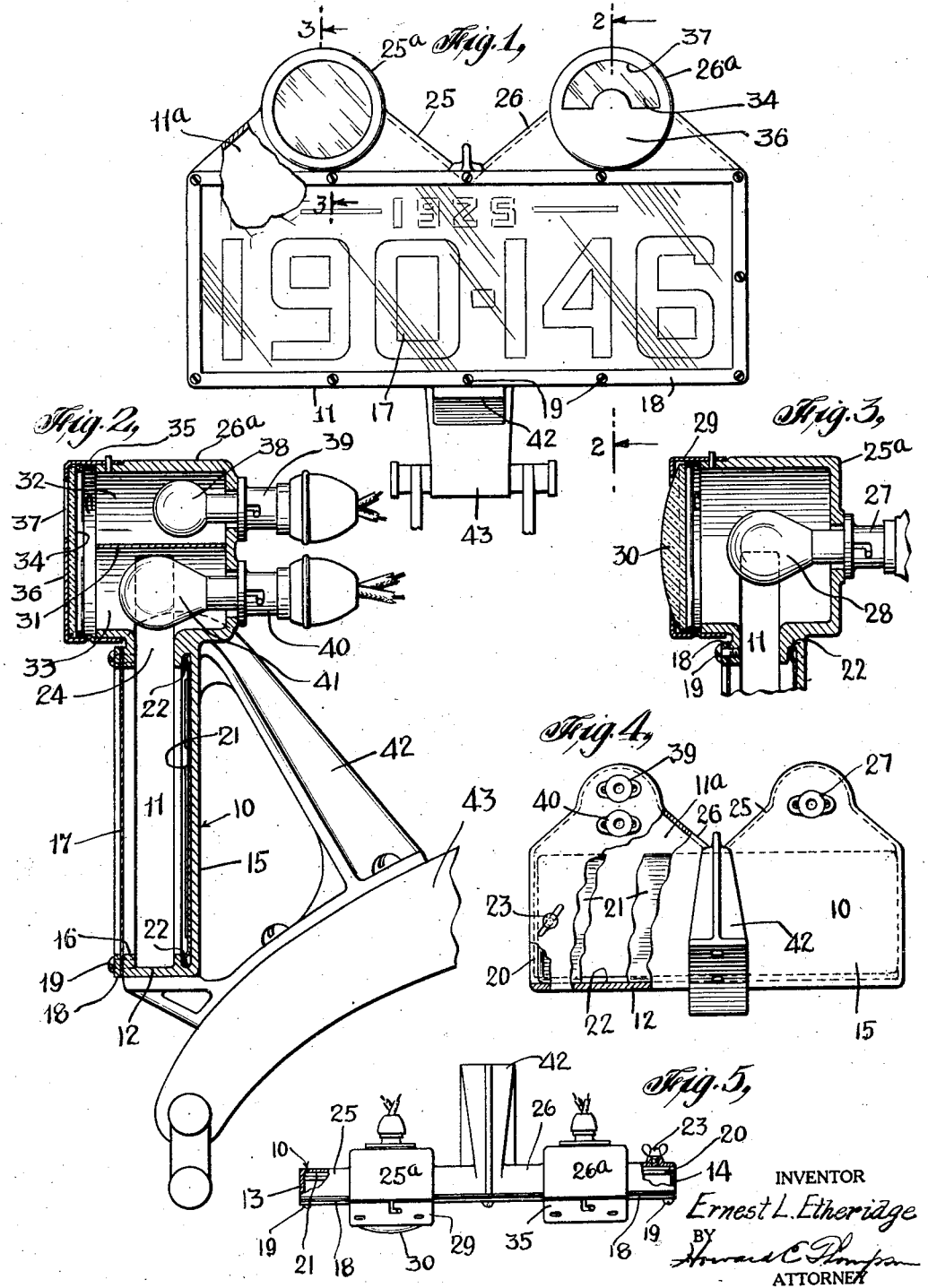
INVENTOR
Ernest L. Etheridge
BY
ATTORNEY Patented Sept. 27, 1927.

1,643,580

UNITED STATES PATENT OFFICE.

ERNEST L. ETHERIDGE, OF BROOKLYN, NEW YORK.

LICENSE-PLATE HOLDER.

Application filed August 22, 1925. Serial No. 51,739.

This invention relates to license plate holders and particularly to devices of this class for receiving and supporting the rear license plate of a motor vehicle in such manner as to provide a complete illumination thereof and to protect the same from the weather; and the object of the invention is to provide a casing in connection with which the license plate is mounted and said casing having an opening therein, through which the numbers and other data of the plate are visible, said opening being closed by a transparent panel; a further object being to provide a casing having a chamber into which the numbers of the license plate open, with means at the top of the chamber for distributing light into the opening of the casing to illuminate the entire area of the license plate; a still further object being to provide in combination with the license plate illuminating means, a red light or tail light and a stop light; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a face view of my improved license plate holder, indicating the method of its use and with part of the construction broken away and in section.

Fig. 2 is a section on the line 2—2 of Fig. 1 on an enlarged scale.

Fig. 3 is a section on the line 3—3 of Fig. 1 on an enlarged scale.

Fig. 4 is a rear view of the device shown in Fig. 1 with parts of the construction broken away and in section; and, Fig. 5 is a plan view of the device as shown in Fig. 4 with parts of the construction broken away.

In practice, I provide a casing 10 preferably formed from cast metal and comprising an oblong, rectangular, box-shaped portion within which is a chamber 11, said casing having a bottom wall 12, end walls 13 and 14 and a back wall 15, the front wall being open as seen at 16 and said opening closed by a transparent panel 17 held in position by a frame 18 secured to the casing 10 by screws 19. It is preferred that the panel 17 be composed of isinglass, transparent celluloid or similar material, rather than glass, although glass may be employed, if desired. The end wall 14 is provided with an aperture 20, through which a license plate 21 is adapted to pass into the casing 10, said plate entering grooves 22 in the top and bottom portions of the casing as seen in Fig. 2 of the drawing to retain the plate 21 in proper position, and a winged set screw 23 is passed through the back wall 15 of the casing and engages the plate 21 adjacent the opening 20 to prevent the rattling of the plate in the casing and also to prevent its displacement.

The top of the casing 10 is open as seen at 24 and the chamber 11 extends into two substantially V-shaped compartments 11$^a$ formed by contracted extensions 25 and 26 at the top of the casing, said extensions being of the width of the casing and terminating in cylindrical housings 25$^a$ and 26$^a$ of greater width than the casing as clearly seen in Figs. 2, 3 and 5 of the drawing. In the housing 25$^a$ is mounted an electric light socket 27 to receive an electric light 28 and the front of the housing 25$^a$ is closed by a detachable cap 29, which carries a red lens 30 representing the signal or tail light of the vehicle. The bulb 28 within the housing 25 is adapted to illuminate that end portion of the casing 10 or the chamber 11 thereof into which the compartment 11$^a$ is exposed, or to the left of the casing 10 as seen in Fig. 1 of the drawing.

The housing 26$^a$ is divided by a baffle wall 31 into top and bottom chambers 32 and 33, both of which are closed by a panel 34 mounted in a detachable cap 35. The cap 35 is provided with a front or facing wall 36 of the form seen in Fig. 1 of the drawing wherein in an arc-shaped portion 37 is cut out to expose the transparent panel 34 therethrough to provide a stop signal light by illumination behind the arc-shaped cut out 37 which is provided by the electric light bulb 38 mounted in the chamber 32 or in a socket 39 provided on the housing 26$^a$. Another socket 40 is provided on said housing for another bulb 41 which is positioned in the chamber 33, the bulb 41 serving to illuminate the other end portion of the license plate or the end portion to the right in Fig.

1 of the drawing, as will be apparent. It will be understood that the diverging walls of the extensions 25 and 26 form reflector faces which facilitate the distribution of the light over the entire area of the license plate, the baffle wall 31 being employed to prevent the illumination of the stop signal or illuminating the chamber 32 when the device is in use.

It will be understood that the stop signal will be operated in the manner of other stop signals commonly employed in connection with motor vehicles and will be automatically controlled, while the bulbs 28 and 41 will be on an independent circuit or the bulb 41 will be in circuit with the tail light circuit so that when the tail light is on, the license plate will be completely illuminated.

The casing 10 is also provided with a backwardly directed bracket construction 42 which will be fashioned to suit its mounting to a part 43 of a motor vehicle of any kind or class. With my improved construction, it will be apparent that means is provided for illuminating the entire license plate whereby the same may be seen at night within a reasonable distance and at a greater distance than it is possible to read license plates with the present method of illumination. While I have shown and described certain details of construction for carrying my invention into effect, it will be understood that I am not necessarily limited to these details, nor am I limited to the specific manner of arranging the separate parts in the construction herein shown and described, and various other changes in and modifications of the construction herein set out may be made within the scope of the appended claims without departing from the spirit of my invention or sacrificing its advantages.

Having fully described my invention, what I claim as new and desire to secure by Letters Patent, is:—

1. A device of the class described comprising an elongated box-shaped casing, the upper end portion of which extends into two substantially conical members terminating in cylindrical bodies, a chamber in said casing opening into said extensions, means for mounting electric bulbs in connection with the cylindrical bodies of said extensions to expose said bulbs to the chamber of said casing, said casing being open at the front and a transparent panel for closing said opening, means for detachably supporting a license plate in connection with said casing to expose the numbers thereof through the opening in said casing, means for mounting a red tail light in connection with one of said cylindrical bodies, and the other of said cylindrical bodies being divided into separate chambers, one of which is exposed to the chamber of the casing, and means for mounting an electric bulb in connection with the other of said chambers to provide a stop light signal exposed through said cylindrical body.

2. A device of the class described comprising a casing, a chamber in the lower end portion of said casing and opening outwardly through one side wall thereof, the upper end of the casing having a pair of diverging reflector surfaces positioned at opposite sides of the casing and opening into the chamber thereof, an illuminating device for each reflector whereby the distribution of light rays from said illuminating devices is distributed over the entire area of the chamber within the casing, means for supporting and retaining a license plate in the casing in such manner as to expose the numerals thereof to said light rays and through the open end of the casing, and a partition wall in the upper end of one side of the casing, forming an independent compartment, a signal lens exposed to said compartment and outwardly through the casing, and an illuminating device in said compartment.

3. A license plate holder of the class described comprising an elongated hollow box-shaped casing, the front wall of which is open, means for mounting a license plate in connection with the rear portion of the casing to expose the numerals thereof, and into the chamber of the casing and outwardly through the open front wall, the top of the casing being extended to form two triangular portions, the walls of which diverge to form reflector surfaces opening into the chamber of the casing, means for supporting an electric light bulb at the upper end of each triangular extension whereby the rays of light emanating from bulbs mounted in the casing are distributed over the entire area of the chamber and over all of the numerals of the license plate mounted in the casing, a red lens mounted in connection with one of the extensions in the casing and exposed therethrough and illuminated by the light in such extension, and the other extension having a partition wall arranged above the bulb mounted therein to form a supplemental chamber, and another light bulb adapted to be supported in said supplemental chamber and exposed through the casing to form a stop signal.

4. A device of the class described comprising an elongated box-shaped casing having a chamber therein opening outwardly through one side wall of the casing, means for supporting a license plate in connection with the other side portion of the casing to expose the numerals thereof into the chamber of the casing and through the open wall thereof, the upper end of the casing extending above the license plate supporting means and being fastened to form at the opposite ends of the casing, two reflector portions opening into the chamber of the casing, one of said reflector portions having a red lens exposed therethrough and the other having a stop signal lens, means for supporting electric light bulbs in the reflector portions of the casing, one of said bulbs serving to illuminate said red lens, means in the upper end of the casing for shielding the other bulb from the stop signal lens, and independent bulb supporting means in the casing for illuminating said stop signal lens.

In testimony that I claim the foregoing as my invention I have signed my name this 21st day of August, 1925.

ERNEST L. ETHERIDGE.